United States Patent [19]

Jones

[11] 4,329,324

[45] May 11, 1982

[54] METHOD OF BURNING SULFUR-CONTAINING FUELS IN A FLUIDIZED BED BOILER

[75] Inventor: Brian C. Jones, Windsor, Conn.

[73] Assignee: Combustion Engineering, Inc., Windsor, Conn.

[21] Appl. No.: 88,997

[22] Filed: Oct. 29, 1979

[51] Int. Cl.³ .......................... C01B 17/00; B01J 8/00
[52] U.S. Cl. ...................................... 423/244; 110/345
[58] Field of Search .......... 423/242 A, 242 R, 244 A, 423/244 R; 110/343, 345

[56] References Cited

U.S. PATENT DOCUMENTS

| | | | |
|---|---|---|---|
| 3,508,506 | 4/1970 | Bishop | 110/165 |
| 3,533,739 | 10/1970 | Pelczarski | 23/134 |
| 3,708,266 | 1/1973 | Gustavson | 423/242 |
| 3,717,700 | 2/1973 | Robison | 423/244 |
| 3,751,227 | 8/1973 | Robison | 423/244 |
| 3,784,676 | 1/1974 | Moss | 423/242 |
| 4,279,207 | 7/1981 | Wormser | 110/345 |

FOREIGN PATENT DOCUMENTS 824883 12/1959 United Kingdom.

*Primary Examiner*—O. R. Vertiz
*Assistant Examiner*—Gregory A. Heller
*Attorney, Agent, or Firm*—William W. Habelt

[57] ABSTRACT

A method of burning a sulfur-containing fuel in a fluidized bed of sulfur oxide sorbent wherein the overall utilization of sulfur oxide sorbent is increased by comminuting the bed drain solids to a smaller average particle size, preferably on the order of 50 microns, and reinjecting the comminuted bed drain solids into the bed. In comminuting the bed drain solids, particles of spent sulfur sorbent contained therein are fractured thereby exposing unreacted sorbent surface. Upon reinjecting the comminuted bed drain solids into the bed, the newly-exposed unreacted sorbent surface is available for sulfur oxide sorption, thereby increasing overall sorbent utilization.

8 Claims, 2 Drawing Figures

METHOD OF BURNING SULFUR-CONTAINING FUELS IN A FLUIDIZED BED BOILER

The Government of the United States of America has rights in this invention pursuant to contract No. EX-76-C-01-2473 awarded by the U.S. Energy Research & Development Administration.

BACKGROUND OF THE INVENTION

The present invention relates to burning sulfur-containing fuels in a fluidized bed boiler and, more particularly, to an improved process of burning sulfur-containing coal in a fluidized bed of sulfur oxide sorbent material wherein utilization of the sulfur sorbent is increased.

The ever growing public awareness of the environment has led to the enactment of legislation at the national, state and local levels directed at preserving our environment for future generations. Particular attention has been given to sulfur dioxide emissions resulting in the promulgation of federal regulations severely restricting emissions of sulfur dioxide in the flue gas generated during the combustion of fossil fuel.

One obvious method of complying with such regulations is to burn only fossil fuels which contain little or no sulfur, such as natural gas and light oils. However, the scarcity of the known domestic reserves of low sulfur oil and natural gas coupled with the high cost of foreign supplies of such fuels precludes the burning of these clean fuels as a viable solution to our air pollution problem.

Domestic supplies of coal are, on the other hand, abundant. Estimates have been given that domestic supplies of coal could satisfy our nation's energy need for the next two to three hundred years. Unfortunately coal is not a clean burning fuel like natural gas or low sulfur oil. Coals found in the United States typically contain sulfur in amounts ranging from about 100 to 1300 nanograms per Joule of heating value. Since any sulfur contained in the coal would, when combusted in the same manner as a clean fuel, be readily converted to sulfur dioxide and emitted to the atmosphere, much attention has been directed to developing methods of burning sulfur-containing fuels such as coal while at the same time preventing pollution of the atmosphere with sulfur dioxide. As a result, interest has been rekindled in the burning of coal in a fluidized bed boiler and, in particular, to the burning of coal in a fluidized bed of sulfur oxide sorbent.

The great potential for minimizing emissions of sulfur dioxide to the atmosphere when burning sulfur-containing fuels such as coal in a fluidized bed of sulfur oxide sorbent has been recognized for some time. For example, British Pat. No. 824,883, issued in 1959, discloses burning a sulfur-containing solid fuel in a fluidized bed of sulfur sorbent such as limestone or dolomite.

In the typical present day fluidized bed boiler, particulate coals having a topsize ranging from 3.0 to 6.5 millimeters are typically fed to and combusted within a fluidized bed of similarsized limestone particles at a relatively low temperature of 760 C. to 925 C. under oxidizing conditions. During combustion within the bed, a major portion of the sulfur dioxide generated reacts with the limestone within the bed thereby forming calcium sulfate which is retained within the bed. Typically, calcium utilization at these conditions is about 20 to 35 percent. Calcium utilization is defined as the overall fractional conversion of available calcium sorbent in the limestone to calcium sulfate via reaction with sulfur dioxide generated during the combustion of a sulfur-containing fuel within the bed. Limestone must be continually fed to the bed at a rate sufficient to maintain the calcium to sulfur mole ratio, defined as the ratio of moles calcium in the limestone feed to moles sulfur in the coal feed, from two-to-one to four-to-one in order to maintain an acceptable sulfur dioxide retention within the bed.

A number of approaches have been suggested for improving calcium utilization in the limestone bed. One approach has been to use extremely fine limestone having a particle size passing a 325 mesh screen, i.e., having a maximum particle size of about 40 microns, as the sulfur absorbing compound within the fluidized bed. However, this approach poses serious problems relating to material handling and, in particular, to increased dust loading when the flue gas is leaving the fluidized bed. In fact, one air pollution problem is substituted for another. That is, a sulfur dioxide emission problem is eliminated; but a particulate emission problem is created. Because of their small size, such fine limestone particles are readily blown upward out of the bed by the fluidizing air which is maintained at a velocity high enough to fluidize the coarser coal particles. As a result of this elutriation of the fine limestone particles from the bed, elaborate and very expensive dust collection equipment must be provided to remove the fine limestone particles from the flue gas prior to venting this flue gas to the atmosphere.

Another approach has been to provide a system for removing the spent sulfur oxide sorbent from the bed and treating it to regenerate its sulfur oxide absorbing capability. One such regeneration system is illustrated in U.S. Pat. No. 3,717,700 wherein the bed drain material, which includes ash, unburned carbon and spent limestone particles, is heated in a slightly oxidizing atmosphere in a second fluidized bed with a carbonaceous fuel to a temperature in the range of 925 C. to 1150 C. to drive off the sulfur retained by the sorbent as $SO_2$ thereby regenerating the sulfur oxide sorption capability of the sorbent. Other known schemes for regenerating the spent sorbent also require heating the spent sorbent in either a reducing or an oxidizing atmosphere. Such regeneration processes all share one major drawback—the energy consumption required to heat the spent sorbent to the high temperatures required to drive off the absorbed sulfur from the spent sorbent. Additionally, the absorbed sulfur is typically driven off as $SO_2$ or $H_2S$ gas which must be removed from the flue gas of the regeneration vessel by a process such as wet scrubbing before venting the flue gas to the atmosphere.

Other approaches which have been suggested include thermally pretreating the limestone before feeding it to the bed to increase its sulfur oxide sorption activity or adding other chemicals to the limestone bed to catalyze the sulfur oxide-calcium reaction. These approaches, however, have proven impractical economically and technologically.

SUMMARY OF THE INVENTION

It is an object of the present invention to increase the utilization of sulfur oxide sorbent in a fluidized bed while avoiding the problems attendant to the prior art approaches discussed hereinbefore.

Applicant's invention is derived from the realization that calcium utilization for sulfur oxide sorption within the fluidized bed of sulfur oxide sorbent is limited by the nature of the sorption reaction itself. The mechanism for sulfur oxide sorption by the sorbent particle is one of sulfation of the sorbent particle. The sulfation reaction takes place first at the surface of the particle and then progresses inward as the $SO_2$ diffuses into the particle through pore opening to the surface of the particle. As a consequence, particle reactivity with $SO_2$ falls off rapidly as a hard shell of sulfate is formed at and near the surface of the sorbent particle thereby covering any remaining pore openings. Thus, sorbent utilization is limited and sorbent becomes spent as the diffusion of $SO_2$ into the particle is inhibited by the formation of a sulfate layer at and near the surface of the sorbent particle.

In accordance with the present invention, coal is burned in a fluidized bed of sulfur oxide sorbent such as limestone, dolomite or soda ash. Particulate material which includes ash particles, spent sulfur oxide sorbent and unburned char, collectively termed bed drain solids, is continuously or periodically removed from the bed and comminuted to a smaller average particle size, preferably on the order of 50 microns. In comminuting the bed drain solids, particles of spent sulfur oxide sorbent contained therein are fractured thereby exposing unreacted sorbent surface. The comminuted bed drain solids are then reinjected into the fluidized bed thereby increasing overall sorbent utilization by providing an additional opportunity for unreacted sulfur sorbing surface within the bed drain material to be exposed and utilized for sulfur sorption.

In the most preferred embodiment of the present invention, the comminuted bed drain solids are mixed with the coal feed prior to reinjection into the fluidized bed simultaneously with the coal feed particles. Intimate contact between the coal feed particles and the newly-exposed sulfur oxide sorbent surface is established and utilization of the newly-exposed sulfur sorbent surface is enhanced. Additionally, the heat contained in the bed drain solids should be sufficient to initiate agglomeration of the coal particles in the coal feed and promote fusion of the comminuted bed drain solids with the coal particles further assuring intimate contact between the newly-exposed sorbent surface and the coal particles and also increasing the average particle size so as to avoid rapid elutriation of the newly-exposed sobent from the fluidized bed.

To assure that this agglomeration occurs, the feed pipe through which the mixture of coal feed particles and comminuted bed drain solids are fed to the bed extends into the bed a sufficient distance to ensure that the mixture traversing therein is preheated before entering the bed.

DESCRIPTION OF THE PREFERRED EMBODIMENT

Figure 1:
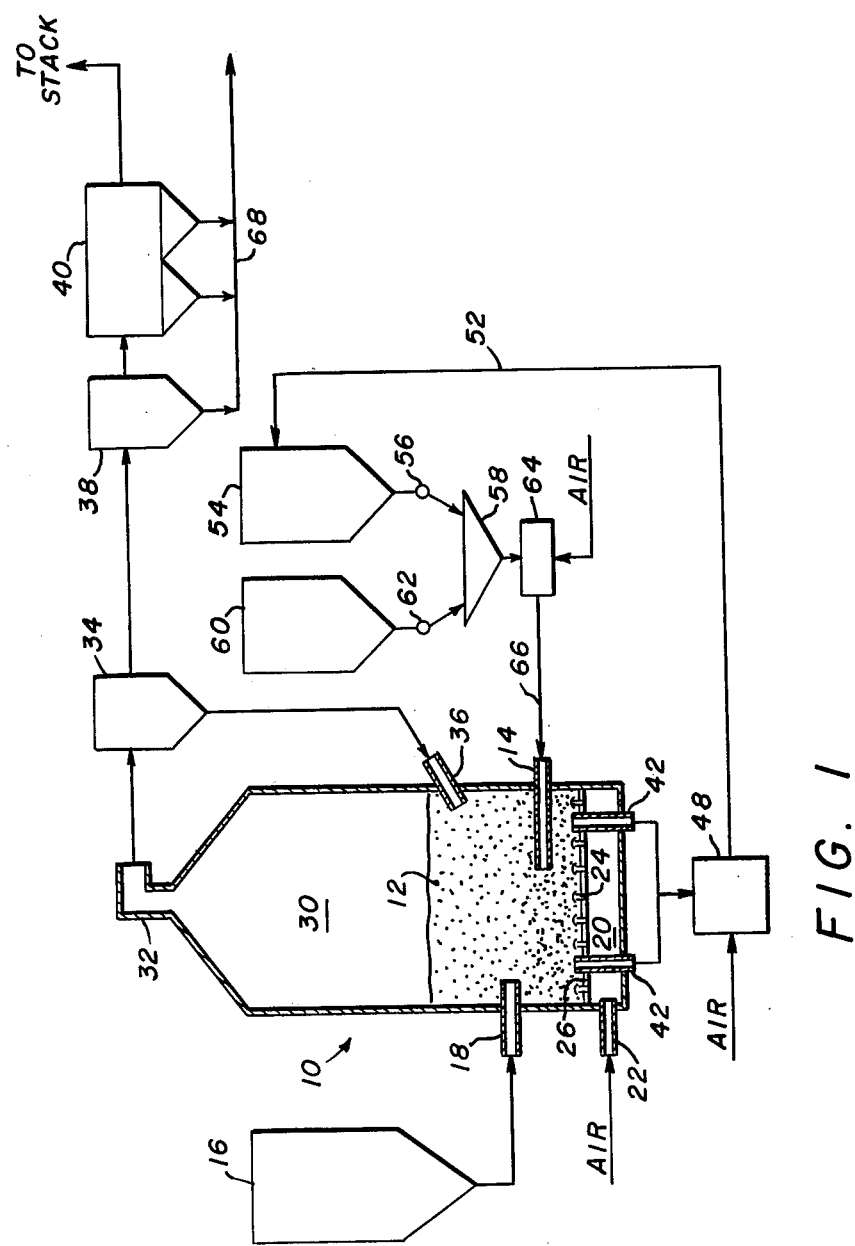
FIG. 1 is a diagrammatic representation of a fluidized bed system incorporating bed drain solids reinjection in accordance with the present invention.

Referring now to FIG. 1 there is depicted a fluidized bed boiler 10 wherein a sulfur-containing fuel, such as particulate coal, is combusted in a fluidized bed 12 of sulfur oxide sorbent fuel and, if desired, additional inert material. Typically, the sulfur oxide sorbent is selected from the group consisting of limestone, dolomite and soda ash. It is to be understood that the term limestone used herein is to be read to encompass other sulfur oxide sorbents including, but not limited to, dolomite or soda ash, and that the term coal as used herein is to be read to include other sulfur-containing fuels such as refuse, petroleum coke or heavy oils.

Particulate coal, typically having a topsize from 6.5 millimeters down to 3.0 millimeters, is supplied to the fluidized bed 12 through coal feed pipe 14 and limestone typically having a topsize ranging from 0.4 millimeters to 9.5 millimeters, is supplied to the fluidized bed 12 from the limestone storage silo 16 through the limestone feed pipe 18. Combustion air is supplied to air plenum 20 located beneath the fluidized bed 12 through inlet 22. The combustion air passes upward from the air plenum 20 into the fluidized bed 12 through a plurality of air ports 24 in the bed support plate 26 at a flow rate sufficiently high enough to fluidize the limestone and particulate coal within the fluidized bed 12.

Combustion of the particulate coal is initiated within the fluidized bed 12 and substantially completed in the free board region 30 located immediately above the bed 12. As the coal particles are consumed in the fluidized bed, their particle size decreases and they become light enough to be blown out of the bed 12 into the free board region 30 by the fluidizing air. Some of the elutriated coal particles will fall back into the bed 12, others will be completely consumed within the free board region 30 and the remaining small portion will be entrained in the combustion flue gases along with other particulate matter such as fly ash and blown out of the boiler 10 through gas outlet 32.

A dust collection train is provided to remove the particulate matter entrained in the flue gases prior to venting them to the stack. Typically, a coarse particulate filter 34, usually a cyclone separator, is disposed in the flue gas stream leaving the fluidized bed boiler 10 to remove the coarse particulate matter entrained therein. This coarse particulate matter is comprised of the coarser fly ash particles and most of the unburned carbon particles elutriated from the bed. Therefore, this coarse particulate matter is recycled to the fluidized bed 12 through the recycle line 36 for combustion of the unburned particles included therein.

The remainder of the dust collection train comprises a fine particulate filter disposed downstream of the coarse particulate filter and designed to remove most of the finer particulate matter still entrained in the flue gases leaving the coarse particulate filter. The fine particulate filter may comprise a high efficiency cyclone separator, a bag filter or, as shown in FIG. 1, a high efficiency cyclone separator 38 in series with a baghouse 40.

In order to maintain bed heights at a preselected level and to purge the bed of unnecessary material such as coal ash particles and spent limestone, it is customary to provide a bed drain system for continuously or periodically removing such material from the bed. As shown in FIG. 1, a typical bed drain system comprises a plurality of bed drain pipes 42 passing through or around the air plenum 20 and extending upward into the bed 12 thereby providing a flow passage communicating between the bed 12 and the outside of the boiler 10 through which the bed drain material can be removed. The material removed through bed drain pipes 42 consist of coal ash particles, spent limestone sorbent and some unburned carbon particles termed char.

The usual practice has been to simply dispose of the bed drain solids as undesirable waste. More recently, however, attention has been given to processing the bed drain solids to recover the spent limestone and/or the unburned char contained therein. As previously mentioned, U.S. Pat. No. 3,717,700 discloses one approach for regenerating the sulfur oxide sorption capability by heating the spent limestone within the bed drain material to a temperature in the range of 925 C. to 1150 C. in order to regenerate active limestone by driving off the $SO_2$ retained by the spent limestone. The regenerated active limestone is then reinjected into the bed to again fulfill its role as a sulfur oxide sorbent thereby improving overall calcium utilization. It is at this point where the Applicant's invention departs from the teaching of the prior art. Applicant's invention is derived from the realization that calcium utilization for sulfur sorption within the fluidized bed of limestone is limited by the nature of the sorption reaction itself. The mechanism for sulfur dioxide sorption by the limestone is one of sulfation of the limestone particles. The sulfation reaction takes place first at the surface of the particle and then progresses inward as the $SO_2$ diffuses into the limestone particles through pores openings to the surface. As a consequence, the limestone particle reactivity with $SO_2$ falls off rapidly as a hard shell of calcium sulfate is formed at and near the surface of the limestone particles thereby covering any remaining pore openings. Thus, calcium utilization is limited and the limestone sorbent becomes spent as the diffusion of $SO_2$ into the limestone particle is inhibited by the formation of a calcium sulfate layer at and near the surface of the limestone particle.

Figure 2:
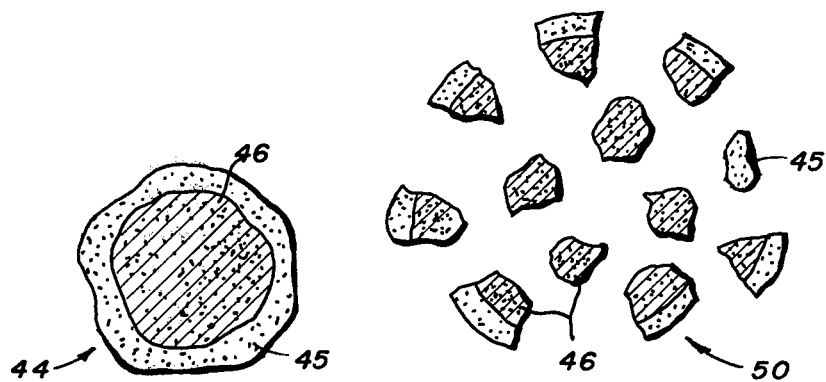
FIG. 2 is an illustration depicting the step of fracturing the sulfated sorbent particle to absorb unreacted sulfur oxide absorbing surface.

In accordance with the present invention, the particulate material, termed bed drain solids, removed from the fluidized bed 12 through the bed drain pipes 42, which includes ash particles, sulfated limestone and unburned char, is comminuted by means such as pulverizer 48 to yield an average particle size less than approximately 100 microns and preferably on the order of 50 microns. Average particle size is herein intended to mean the arithmetic mean particle size. In comminuting the bed drain solids, the sulfated limestone particles 44 are fractured into smaller particles 50 thereby exposing the unreacted limestone surface of the core 46 of the original sulfated limestone particle 44 as illustrated in FIG. 2. The comminuted bed drain solids are then reinjected into the fluidized bed 12 thereby increasing the overall calcium utilization by providing an additional opportunity through the unreacted limestone within the bed drain material to be utilized for sulfur oxide sorption.

In the most preferred embodiment of the present invention, the comminuted bed drain solids are mixed with the coal feed and then reinjected into the fluidized bed simultaneously with the coal particles to take advantage of the agglomeration properties of the coal particles. As illustrated in FIG. 1, the comminuted bed drain solids are conveyed in a transport air stream from pulverizer 48 through line 52 to surge bin 54. The comminuted bed drain solids are then fed from the surge bin 54 through feeder 56 to mixer 58 and mixed therein with particulate coal also being fed to the mixer 58 from coal storage bin 60 through feeder 62. The mixture of particulate coal and comminuted bed drain solids is discharged from the mixer 58 to the solids pump 64 conveyed with transport air of a dense phase mixture through line 66 to feed pipe 14. The particulate coal and comminuted bed drain solids are mixed within mixer 58 in proportions deemed to provide ultimate conditions for subsequent fusion of the newly-exposed unreacted limestone sorbent within the comminuted bed drain solids with the particulate coal as the coal particles agglomerate during transport to the bed.

Agglomeration is a softening or a caking of the coal to the extent that the coal particles become transformed into a plastic state. It is expected that sufficient heat up of coal particles to initiate agglomeration can be attained within the transport line 66 by natural heat transfer from the comminuted bed drain solids being transported in the dense phase mixture with the coal, as the bed drain solids having been removed from the fluidized bed 12 at bed temperature, typically 760 C. to 925 C., are being continuously recycled with only a short time lapse from removal to reinjection.

To assure that this agglomeration occurs, the feed pipe 14 through which the mixture of coal feed particles and comminuted bed drain solids are fed to the fluidized bed 12 extends into the bed a sufficient distance to ensure that the mixture traversing the feed pipe 14 is heated before entering the bed. Because of the high temperature of the fluidized bed 12, agglomeration of the coal particles traversing feed pipe 14 is further promoted and fusion of a significant portion of the newly-exposed unreacted limestone sorbent with the agglomerated coal particles is assured.

Agglomeration will tend to fuse the comminuted bed drain solids with the coal being fed to the fluidized bed thereby ensuring intimate contact between the sulfur-containing coal and the newly-exposed sulfur oxide absorbing surface of the unreacted limestone within the comminuted bed drain solids. Additionally, the fusion of the coal particles with the comminuted bed drain solids will tend to increase the average particle size of the fused mixture which should lead to a longer residence time of the fused particles within the bed as elutriation therefrom will be delayed until the fused particles are reduced in size by combustion within the bed. Therefore, a more complete reaction of the newly-exposed limestone sorbent with $SO_2$ will be promoted; and overall calcium utilization will be increased.

As the recycled bed drain solids are elutriated from the bed 12 into the free board region 30, they are entrained in the flue gases and passed out of the boiler 10 through gas outlet 32. Because of their small average particle size, the comminuted bed drain solids will pass through the coarse particulate filter 34 but will be removed from the flue gases in the fine particulate filters 38 and 40. Also because of the small particle size of the newly-exposed limestone particles within the recycled bed drain solids, it is expected that the material removed in the filters 38 and 40 will consist of minimal unreacted limestone. The material removed in filters 38 and 40, which consists primarily of fly ash particulate, calcium sulfate particles and a minimal amount of unreacted limestone, will be discharged from the system through line 68 for disposal or other uses. Since the recycled bed drain material is small enough to pass through the coarser filter 34, it is not collected therein and again recycled to the bed through line 36. Thus, ever increasing dust loading of the flue gases is avoided.

Testing conducted on a laboratory scale fluidized bed boiler evidences the success of Applicant's invention in increasing overall carbon utilization. For example, coal was combusted in a fluidized bed of limestone at a bed temperature of 785 C. with a calcium to sulfur mole ratio of approximately 2.0. In steady-state operation without recycling the bed drain solids, SO$_2$ levels in the flue gas measured approximately 1000 ppm. This emission level is equivalent to a 72 percent sulfur retention within the bed and a 36 percent calcium utilization.

Upon pulverizing the bed drain solids to an average particle size of about 70 microns and reinjecting these pulverized bed drain solids into the bed, SO$_2$ emissions began to drop rapidly. Upon reaching steady-state operation with bed drain solids recycle, SO$_2$ levels in the flue gases measured approximately 550 ppm's. This emission level is equivalent to an 85 percent sulfur retention within the bed and a 43 percent calcium utilization. Accordingly, by simply pulverizing the bed drain solids to an average particle size of 75 microns and reinjecting them into the bed, sulfur oxide emissions were reduced, sulfur retention within the bed was increased and calcium utilization was increased while maintaining the calcium to sulfur mole ratio at approximately 2.0. Further testing revealed that to achieve this same level of sulfur retention and calcium utilization within the bed without pulverizing and recycling the bed drain material would require a calcium to sulfur mole ratio of about 2.7. In other words, limestone feed rates could be reduced 25 percent in this test facility without an increase in sulfur oxide emissions if the bed drain material were pulverized to an average size of 75 microns when recycled to the bed.

It should be emphasized that the increased calcium utilization and the limestone feed reductions cited in the above example were achieved without agglomerating the pulverized bed drain solids with the incoming coal as envisioned in Applicant's most preferred embodiment. It is expected that an even greater reduction in limestone feed in the range of 50 percent and an even greater increase in calcium utilization can be achieved by operating a fluidized bed in accordance with the preferred embodiment of Applicant's invention, that is by mixing the pulverized bed drain solids with the coal particles being fed to the bed and promoting the agglomeration of the coal particles with the newly-exposed limestone absorbent prior to reinjection into the bed.

I claim:

1. In a method of burning a sulfur-containing coal, of the type wherein the sulfur-containing coal is fed to a fluidized bed of particulate material containing sulfur oxide sorbent and burned therein in close association with the sulfur oxide sorbent; and wherein particulate matter, including spent sulfur oxide sorbent, is periodically or continuously drained from the bed, the improvement comprising:

a. comminuting the particulate matter drained from the bed to a smaller particle size, thereby fracturing the spent sulfur oxide sorbent included therein so as to expose unreacted sulfur oxide absorbing surface;

b. mixing the comminuted particulate matter, including the fractured particles of spent sulfur oxide sorbent having newly-exposed unreacted sulfur oxide sorption surface, with the sulfur-containing coal being fed to the fluidized bed, thereby establishing intimate contact between the sulfur-containing coal and the newly-exposed sulfur oxide sorption surface;

c. heating said mixture of comminuted particulate matter with the sulfur-containing coal so as to effect the agglomeration of the coal in said mixture thereby fusing the comminuted particulate matter in intimate contact with the sulfur-containing coal; and d. injecting said fused mixture of comminuted particulate matter and sulfur-containing fuel into the bed.

2. A method as recited in claim 1 wherein the source of heat for effecting the agglomeration of the coal is the latent heat contained in the comminuted particulate matter, the particle material to be comminuted being drained from the bed at a temperature of 760 C. to 925 C. and continuously recycled with only a short time lapse from removal to reinjection.

3. A method as recited in claim 1 wherein the step of heating said mixture of comminuted particulate matter and coal comprises passing said mixture in heat exchange relationship with the fluidized bed prior to injecting said mixture into the bed.

4. A method as recited in claims 1, 2, or 3 wherein the step of comminuting the particulate matter drained from the bed to a smaller particle size comprises comminuting said particulate material to an average particle size of less than approximately 100 microns.

5. A method as recited in claim 4 wherein the step of comminuting said particulate matter to an average particle size of less than approximately 100 microns comprises comminuting said particulate material to an average particle size of approximatley 50 microns.

6. A method as recited in claims 1, 2, or 3 wherein the sulfur oxide sorbent is selected from the group consisting of limestone, dolomite, and soda ash.

7. A method as recited in claim 4 wherein the sulfur oxide sorbent is selected from the group consisting of limestone, dolomite, and soda ash.

8. A method as recited in claim 5 wherein the sulfur oxide sorbent is selected from the group consisting of limestone, dolomite, and soda ash.

* * * * *